US008381178B2

(12) United States Patent
Martino et al.

(10) Patent No.: US 8,381,178 B2
(45) Date of Patent: Feb. 19, 2013

(54) INTUITIVE VISUALIZATION OF BOOLEAN EXPRESSIONS USING FLOWS

(75) Inventors: Jacquelyn A. Martino, Yorktown Heights, NY (US); Paul M. Matchen, Yorktown Heights, NY (US); Rosario A. Uceda-Sosa, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/497,378

(22) Filed: Jul. 2, 2009

(65) Prior Publication Data

US 2011/0004834 A1    Jan. 6, 2011

(51) Int. Cl.
    *G06F 9/44* (2006.01)
(52) U.S. Cl. ........ 717/109; 717/132; 717/155; 717/104; 717/143; 717/144
(58) Field of Classification Search ...... 704/9; 717/109, 717/132, 156
    See application file for complete search history.

(56) References Cited

U.S. PATENT DOCUMENTS

| | | | |
|---|---|---|---|
| 5,175,814 A | 12/1992 | Anick et al. | |
| 5,471,613 A | 11/1995 | Banning et al. | |
| 5,701,456 A | 12/1997 | Jacopi et al. | |
| 5,721,900 A | 2/1998 | Banning et al. | |
| 5,790,778 A * | 8/1998 | Bush et al. | 714/38.1 |
| 5,933,145 A | 8/1999 | Meek | |
| 6,026,388 A * | 2/2000 | Liddy et al. | 1/1 |
| 6,925,608 B1 | 8/2005 | Neale et al. | |
| 2003/0200208 A1 | 10/2003 | Sajwan et al. | |
| 2004/0039730 A1 | 2/2004 | Saeki | |
| 2004/0172520 A1 | 9/2004 | Smit et al. | |
| 2005/0222980 A1 | 10/2005 | Lee | |
| 2005/0262056 A1 | 11/2005 | Hamzy et al. | |
| 2006/0195427 A1 | 8/2006 | Kilroy | |
| 2008/0109475 A1 * | 5/2008 | Burmester et al. | 707/102 |

OTHER PUBLICATIONS

Hildreth, Sue, Rounding Up Business Rules, Computerworld, May 23, 2005, www.computerworld.com/printthis/2005/0,4814,101844,00.html.
U.S. Office Action mailed Oct. 27, 2011 in related U.S. Appl. No. 12/497,319.

* cited by examiner

*Primary Examiner* — Chat Do
*Assistant Examiner* — Jae Jeon
(74) *Attorney, Agent, or Firm* — Scully, Scott, Murphy & Presser, P.C.

(57) ABSTRACT

The system and method in one aspect allow understanding of Boolean expressions by representing them graphically as a flow of information. NOTs are represented as switches in the flow, capturing the original structure of the expression as written by the user. Verification of those expressions with live data is also enabled.

17 Claims, 6 Drawing Sheets

| Name | Role | Department | Area | Age |
|---|---|---|---|---|
| John Smith | Manager | Software | EMEA | 67 |
| Elaine Roberts | Accountant | Corporate | Asia | 68 |

705 — John Smith row
710 — Elaine Roberts row

INTUITIVE VISUALIZATION OF BOOLEAN EXPRESSIONS USING FLOWS

CROSS-REFERENCE TO RELATED APPLICATIONS

This application is related to co-owned U.S. patent application Ser. No. 12/497,370 entitled "METHOD AND SYSTEM FOR SMART MARK-UP OF NATURAL LANGUAGE BUSINESS RULES" and U.S. patent application Ser. No. 12/497,319 entitled "MODULAR AUTHORING AND VISUALIZATION OF RULES USING TREES," filed on Jul. 2, 2009. Those applications are incorporated herein by reference in their entirety.

BACKGROUND

The present application generally relates to information management systems, and more specifically to intuitive visualization of Boolean expressions using flows.

Decisions made by business enterprises can be represented by one or more business rules. As used herein the term "rule" refers to one or more actions or operations that are performed upon the satisfaction of one or more conditions. A "business rule" refers to one or more business actions or business operations that are performed upon the satisfaction of one or more conditions. For example, in the context of a financial company that issues credit cards, the process for determining whether to offer a credit card to a particular individual based upon particular financial or demographic information can be represented by one or more business rules.

Formulating business decisions into business rules allow those business decisions to be automated using computer software. That is, the business logic and conditions defined by business rules can be embodied in computer software. Referring to the prior example, it is not uncommon for financial companies to automate, using computer software, the decision about whether a credit card should be offered to a particular individual. Conventionally, these types of computer systems use complex customized software to implement business rules.

A significant problem with using custom software to implement business rules is that the people in business organizations who decide on changes to business rules generally cannot themselves implement those changes in the computer software. When business logic or conditions change, the computer software must be updated to reflect the change. For example, in the context of issuing credit cards, if the minimum salary requirement is changed from X to Y, then the software must be manually updated to reflect the change in the minimum salary requirement from X to Y. Updating computer software generally requires technical expertise that the business people who decide the business rules may not have. These people are often financial analysts or high-level managers. Updating the software typically involves changing values in source code or data files and then "rebuilding" the software, which requires recompiling source code to generate object code and then linking the object code with libraries of other object code to generate a new runtime executable.

Rule engines have become critical in today's businesses. Some of the major reasons for this need are identified as: 1. the businesses' need to react quickly to a rapidly changing environment; 2. the growing prevalence of less technical users who are becoming responsible for building, editing and validating rules of the business (the business user); 3. an increased demand for businesses to create audit trails; 4. a "patch" for legacy systems; and 5. interest in business process management and integration with service oriented architectures.

Existing systems remain focused on the highly technical user and as such are not easy to use for business users. The existing solutions also force a top-down methodology whereby the user must understand the entire intent of a rule before being able to manipulate it. These solutions employ methods such as tables or spreadsheet type inputs and/or large decision trees. While such methods may be very effective for solving simple systems of rules, they become untenable for medium and large systems of rules. A trend in the known solutions is to use iconic representation, visual systems and natural language to represent rules in the system. Such methods promise increased ability to handle medium and larger systems of rules, yet they do so with the user as the primary composer of the formalized rule.

Users want to make business policy maintenance an activity of business users rather than developers. In industries like banking, insurance, marketing or travel, business users should be able to author and manage their business knowledge directly, without involving the IT (information technology) departments.

BRIEF SUMMARY

A method and system of visualizing Boolean expressions are provided. The method in one aspect may comprise identifying one or more Boolean operators in a Boolean expression; representing Boolean operators in the Boolean expression as graphical symbols; representing one or more NOT operators in the Boolean expression as one or more switches respectively; and building a visual flow of path representing the Boolean expression using the graphical symbols and said one or more switches.

A system of visualizing Boolean expressions, in one aspect, may comprise a processor and a module executable on the processor and operator to identify one or more Boolean operators in a Boolean expression, represent Boolean operators in the Boolean expression as graphical symbols, represent one or more NOT operators in the Boolean expression as one or more switches respectively, and build a visual flow of path representing the Boolean expression using the graphical symbols and said one or more switches.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

System and method are provided that enable users, for example business users, to author rules that customize the behavior of an application. For example, consider discount and promotion rules such as "If the traveler is a manager and is over 65 years old, then give a 10% discount" or "give free shipping in kitchenware or dinnerware excluding Corning Supreme Line items and Henckels Cosmopolitan knives." The difficulty presented of authoring this kind of rule for business users is understanding the Boolean expressions of the "IF" part involving "AND", "OR" and "NOT". Business users are seldom confident that what they have written and what the system will interpret is the same thing, especially when the Boolean expressions are complex. In some cases, even programmers have problems visualizing the semantics of complex Boolean expressions.

To correctly understand a Boolean expression containing a NOT over a subexpression containing AND's or OR's, one must understand DeMorgan's Law. This involves changing the direction of the comparison and reversing the Boolean operator.

For example, in the expression:

"Traveler is a Manager AND Traveler is over 65 years old"

The Traveler must both be a manager and over 65 years old for the expression to be true. However, in the expression:

"NOT(Traveler is a Manager AND Traveler is over 65 years old)"

The Traveler must either NOT be a Manager or the Traveler must be less than or equal to 65 years old. This transformation is both awkward and error prone and becomes even more complex when the expression contains nested NOTs.

Figure 2:
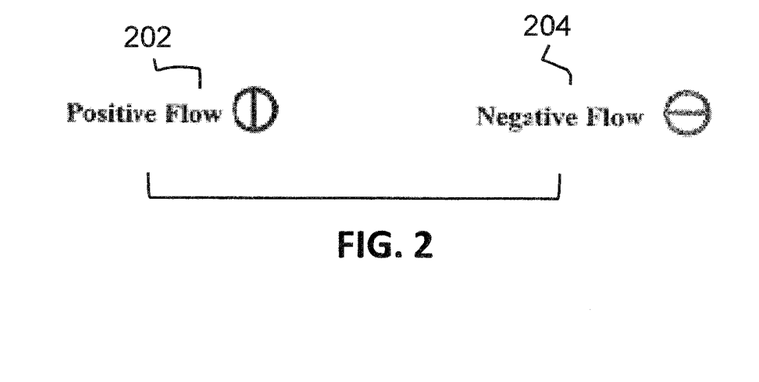
FIG. 2 illustrates example graphical symbols that may be used to represent different Boolean operations.

In the present disclosure, the understanding of Boolean expressions is simplified, for instance, by representing them graphically as a flow of information. Further, the system and method of the present disclosure elegantly represent "NOT" Boolean expression by representing NOTs as switches 202 and 204 in the flow, capturing the original structure of the expression written by the user. The user enters a fragment of a rule in English. The system and method of the present disclosure parses the rule, and generates a parse tree. The system and method of the present disclosure use the parse tree to generate a graphical flow diagram representing the user's rule expression. The system and method of the present disclosure also provide for the verification of these expressions with live data, providing immediate feedback to the user.

Figure 1:
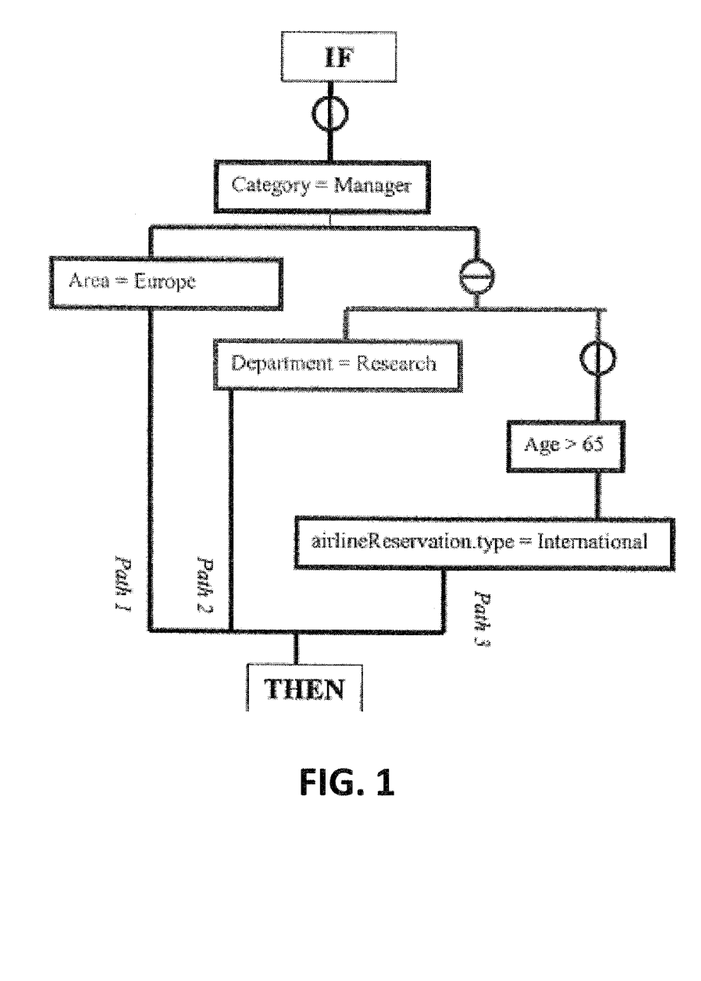
FIG. 1 illustrates a Boolean expression visualized as a flow of information according to one embodiment of the present disclosure.

FIG. 1 illustrates a Boolean expression visualized as a flow of information according to one embodiment of the present disclosure. For example, consider the rule:

IF Category=Manager AND (Area=Europe OR NOT (Department=Research AND NOT (Age >65 OR AirReservation.type=International))) THEN AirReservation.class=Business The semantics of the Boolean expression in the IF condition of the above expression (generally referred to as antecedent of a Boolean expression) can be understood better by visualizing how instance data, i.e., various different test inputs for the expression, would flow from the IF to the THEN shown in FIG. 1. For example, referring to the table shown in FIG. 7, each of 705 and 710 is data instances, where specifically as in 705 Name="John Smith", Role="Manager", Department="Software", Area="EMEA", Age="67". Using the method or system of the present disclosure, the user could author the expression, see a graphical flow of the expression, and enter or import the instance data to test the expression as to whether it passes or fails the IF condition test. In order to satisfy the expression, i.e., to get to the THEN clause of the expression, all the conditions in the antecedent, i.e., in this case, the IF clause of the expression, need to be satisfied. Visualization may include color coding where conditions in blue should be satisfied while conditions in red should not be satisfied. For example, satisfying instance is a manager in Europe (path 1) OR a Manager that is not in research (path 2) OR a manager whose age >65 and traveling internationally (path 3). The flow shown in FIG. 1 is easier to trace or parse then the text of the expression.

In one embodiment, different graphics may represent different operators. FIG. 2 illustrates example graphical symbols that may be used to represent different Boolean operations. The NOT operator may be represented by a positive flow and a negative flow icons as shown at 202 and 204. Initially an expression starts with a positive flow icon 202. If a NOT occurs in the flow of the expression, if the branch of the flow is positive, then a negative flow icon 204 is used to represent the NOT and the flow of that path becomes a negative flow. If the branch of the flow is negative when a NOT is encountered, that NOT is represented by a positive flow icon 202 and the flow of that path becomes a positive flow.

Figure 3:
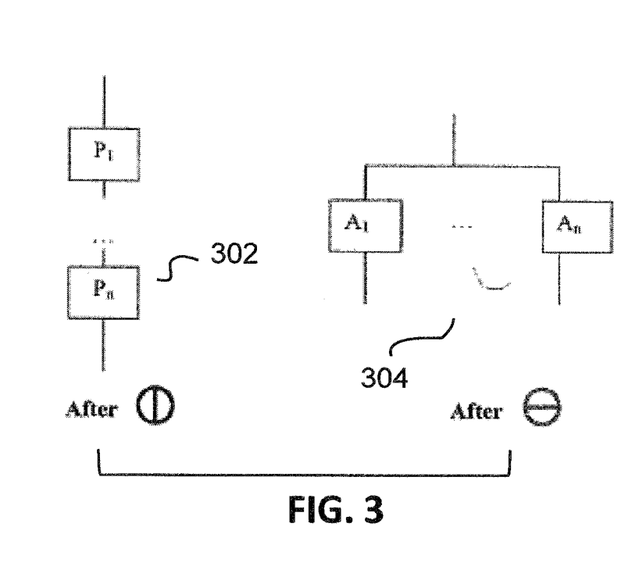
FIG. 3 shows the AND operator and expression flows visualized according to one embodiment of the present disclosure.

The AND operator may have two representations, depending on whether the preceding flow icon in the path is positive or negative. FIG. 3 shows the AND operator and expression flows visualized according to one embodiment of the present disclosure. As per DeMorgan's Law, if the flow of the path is positive 302, then and AND'd expression requires both conditions to be true. The method and system of the present disclosure in embodiment visualizes the flow, such that the flow passes through the first expression and then through the second expression. However, if the flow of the path is negative 304, then the AND'd expression requires either one of the AND'd conditions to be true. In that case, the method and system of the present disclosure in embodiment divides the flow and each path of the flow passes through only one of the two conditions.

Figure 4:
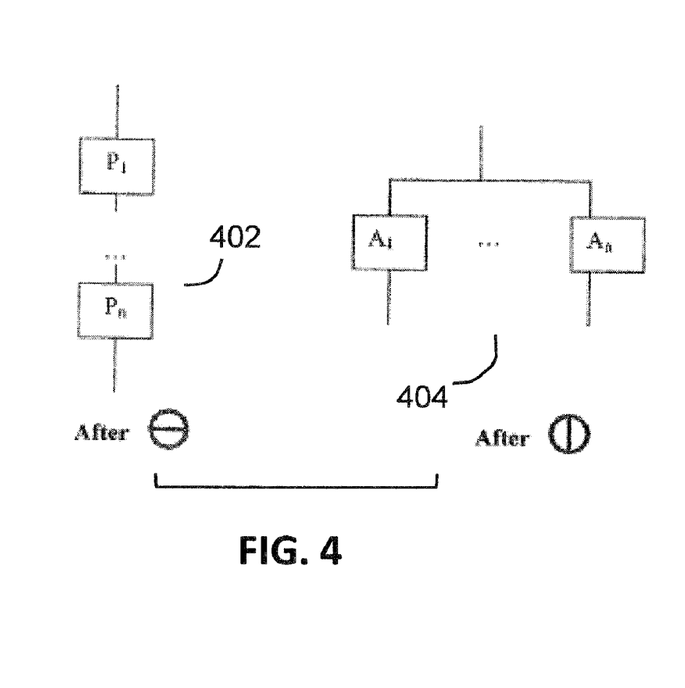
FIG. 4 shows the OR operator and expression flows visualized according to one embodiment of the present disclosure.

The OR operator may also have two representations, depending on whether the previous flow icon in the path is positive or negative. FIG. 4 shows the OR operator and expression flows visualized according to one embodiment of the present disclosure. As per DeMorgan's Law, if the flow of the path is negative 402, then an OR'd expression requires both conditions to be true, so the flow passes through the first expression and then through the second expression. However, if the flow of the path is positive 404, then the AND'd expression requires either one of the AND'd conditions to be true, so the flow divides and each path of the flow passes through only one of the two conditions.

Figure 5:
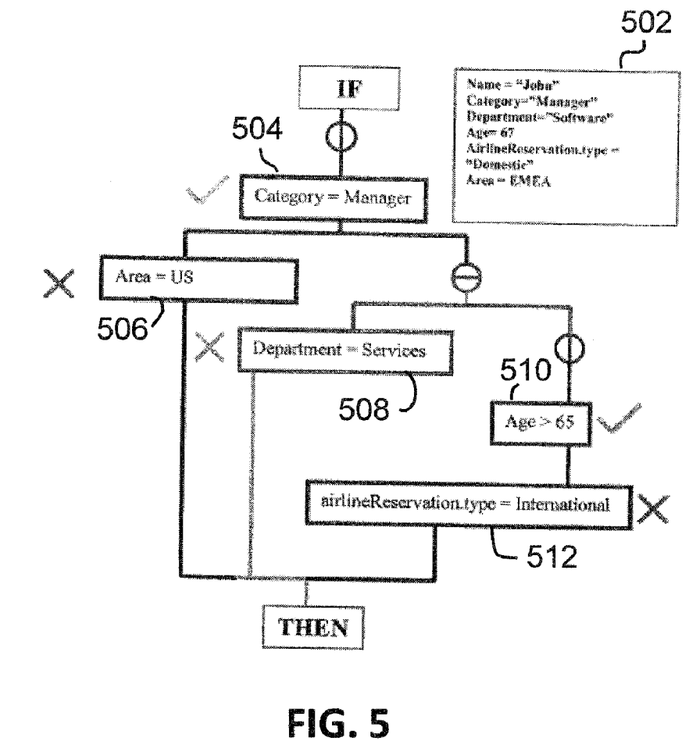
FIG. 5 illustrates an example showing a flow from the IF to the THEN logic in a Boolean expression.

FIG. 5 illustrates an example showing a flow from the IF to the THEN logic. Satisfied and not satisfied expressions in the Boolean expression and path taken in the flow can be visualized in FIG. 5, for instance, with color coding or other visual effects, as pertains to different instances of data. For the instance with data values shown in 502, "Category=Manager" expression 504 is satisfied because the category is "Manager." "Area=US" 506 is not satisfied because the area is "EMEA." "Department=Services" 508 is not satisfied because Department is "Software." "Age >65"

510 is satisfied because "Age" is "67." "AirlineReservation.type=International" 512 is not satisfied because the AirlineReservation.type is "Domestic." The user can thus view the path that is taken in the logic of the Boolean expression in one view, without having to run through the computation of the Boolean expression.

Figure 6A:
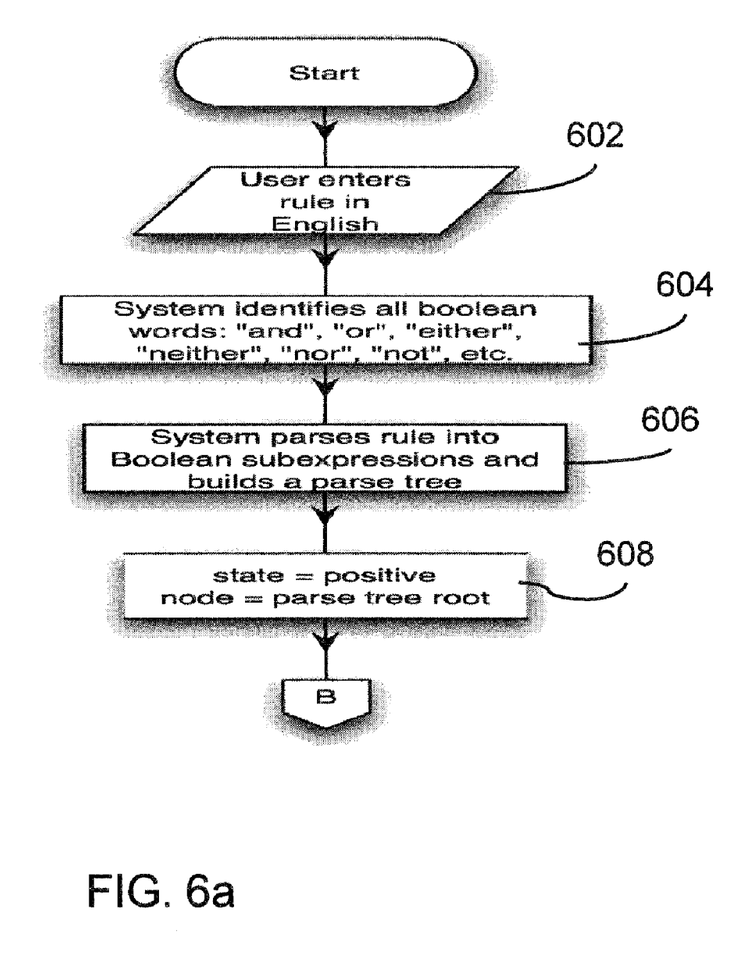
FIGS. 6a and 6b show a flow diagram illustrating the method of the present disclosure for visualizing a Boolean expression as a flow of information in one embodiment.
Figure 6B:
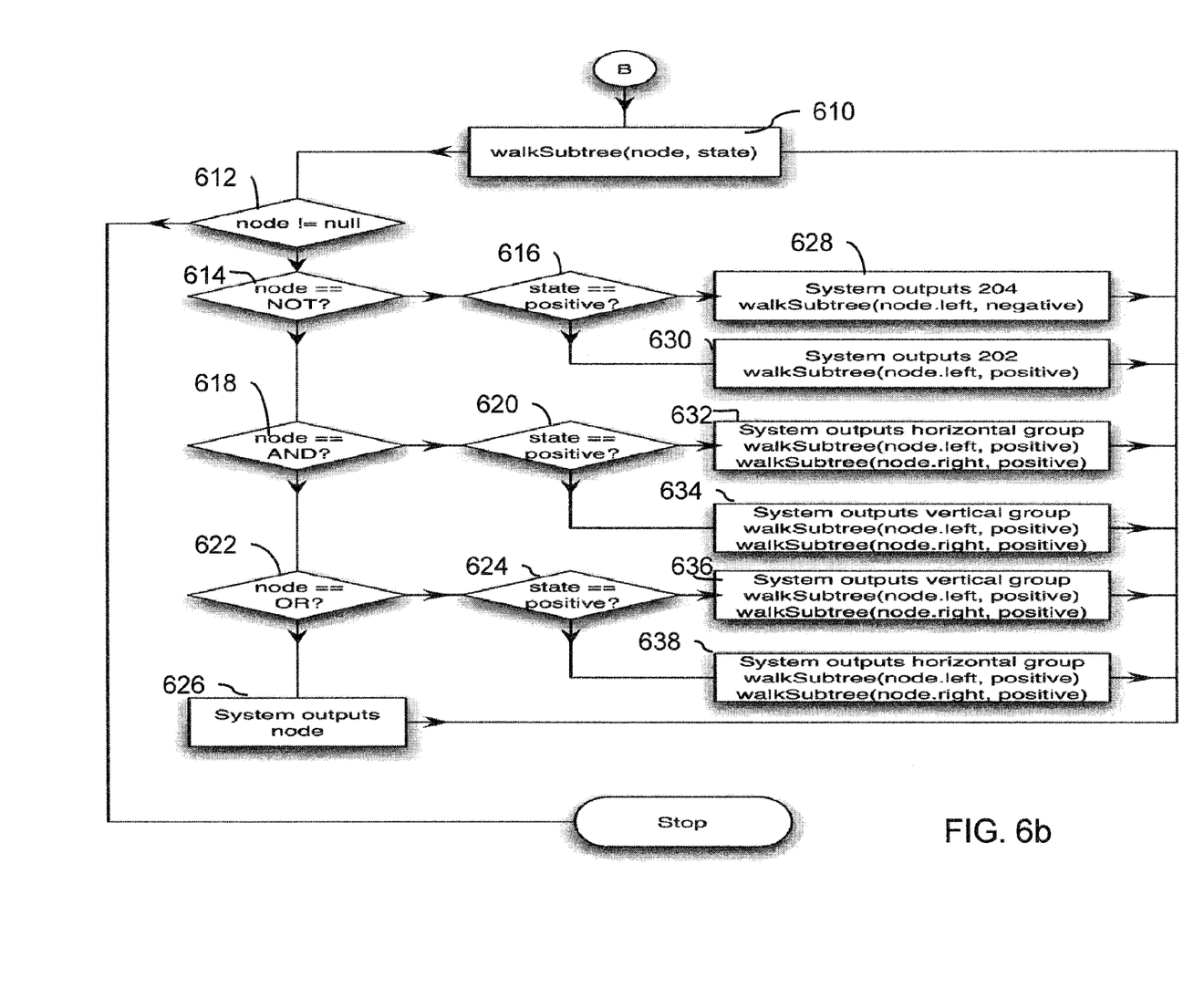

FIGS. 6a and 6b illustrate a method of parsing a Boolean expression and outputting the graphical notations in one embodiment. At 602, a rule is entered in natural language, for example, English, but not limited to only English. For example, the system and method of the present disclosure may work also in other languages, such as French, Japanese, etc. At 604, all Boolean words such as "and", "or", "either", "neither", "nor", and "not" and others are identified. The term "system" used in FIGS. 6a and 6b, refers generally to a system and/or method of the present disclosure, from example, a computer system, logic, circuit, software executing on a computer processor, firmware, etc., or any combinations thereof, that includes the functionalities described herein. At 606, the rule is parsed into Boolean subexpressions and a parse tree is built. Using the parse tree, graphical visualization, for example, shown in FIG. 1, may be built, for instance, using the recursive methodology shown at 608-638. Other methods may be used. At 608, initial state is set and a pointer is set to point to the root of the parse tree.

FIG. 6b shows one example implementation of walking through the parse tree and building the visualization graph. Other methods may be used to interpret the Boolean expression and build visualization. Thus, the invention is not limited only to the methodology shown in FIGS. 6a and 6b. Rather, those steps are illustrated as examples. Referring to FIG. 6b, at 610 the parse tree starting at the root node is traversed until a Boolean operator node (node) is encountered. At 612, if the node is not null, at 614, it is determined whether the node is a NOT operator. At 616, if the node is a NOT operator, at 616 it is determined whether the state is positive or negative. At 628, if the state is negative, a negative flow graphic notation (e.g., 204 FIG. 2) is output. Then the traversing of the parse tree continues with the next child node. At 630, if the state is positive, a positive flow graphic notation (e.g., 202 FIG. 2) is output. Then the traversing of the parse tree continues with the next child node. If leaf node is encountered, the method continues to 610.

At 618, if the node is an AND operator, at 620 it is determined whether the state is positive. At 632, if the state is negative, a horizontal group of operands is output, for example, as shown in FIG. 3, 304. Then the traversing of the parse tree continues with the child nodes with the state reset to positive. At 634, if the state is positive, a vertical group of operands is output, for example, as shown in FIG. 3, 302. Then the traversing of the parse tree continues with the child nodes with the state reset to positive. If leaf node is encountered, the method continues to 610.

At 622, if the node is an OR operator, at 624 it is determined whether the state is positive. At 636, if the state is positive, a horizontal group of operands is output, for example, as shown at FIG. 4, 404. Then the traversing of the parse tree continues with the child nodes with the state reset to positive. At 638, if the state is negative, a vertical group of operands is output, for example, as shown in FIG. 4, 402. Then the traversing of the parse tree continues with the child nodes with the state reset to positive. If leaf node is encountered, the method continues to 610.

At 626, if the node is not a Boolean operator, the node is output. At 612, if the node is null, the traversing and outputting terminates.

Figure 7:
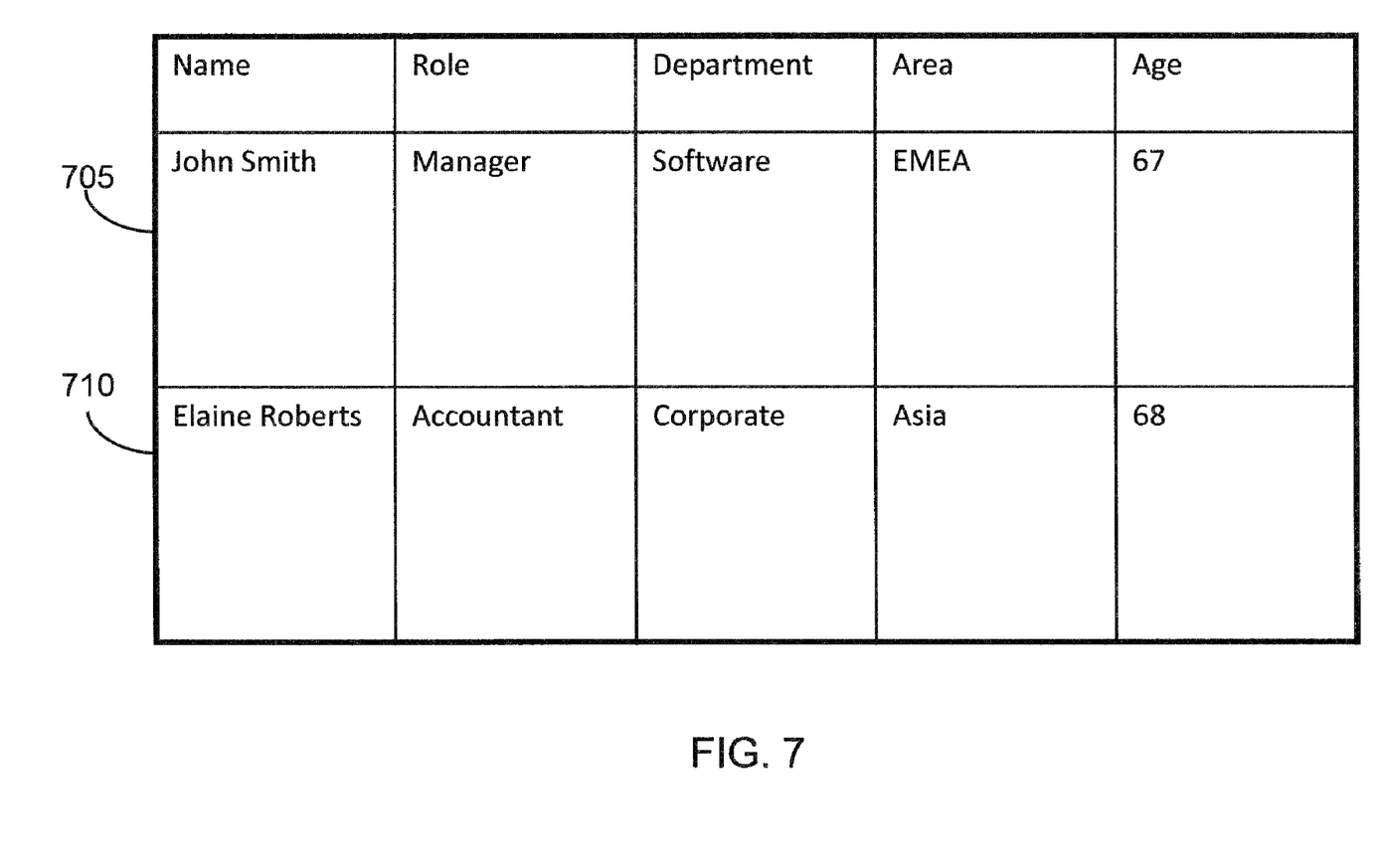
FIG. 7 illustrates a table that shows visualizing the instance data.

The system and method of the present disclosure also may facilitate validating the Boolean expression with live data. For example, a user interface or program or like may be implemented to present a table object containing data instances. FIG. 7 illustrates a table with the instance data, which may be presented to the user, for example, on a computer monitor or like. The top row indicates the attributes and each row following it (705, 710, etc.) shows the values for those attributes, i.e., data instances. For example, at 710, a person named "Elaine Roberts" has a role of "accountant" in a "corporate" department, in "Asia" area and is "68" years of age. The data instances in the table are enterable and editable. That is, the user interface or like of the present disclosure in one embodiment allows the users to enter the data into the table or edit the data entered into the table. The user may select a sample instance of a manager and "drop" the instance data on the flow. For example, the user may click on a row 705 or 710 and 'drop' it into the starting node 504 (FIG. 5) of the expression. The system and/or method of the present disclosure may highlight or use any other indications visual or otherwise to signal each node that is satisfied by the instance data. For example, for the data instance of row 705, the nodes 504, 510, from top down, may be highlighted stopping at a node in the flow expression that the instance data does not satisfy. If any of the final (childless) nodes e.g., 506, 508 or 512 is satisfied, then the instance data satisfies the expression. However, since in the example of row 705, none of 506, 508 or 512 is satisfied and therefore remains childless, the instance data does not satisfy the expression, i.e., the expression fails.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
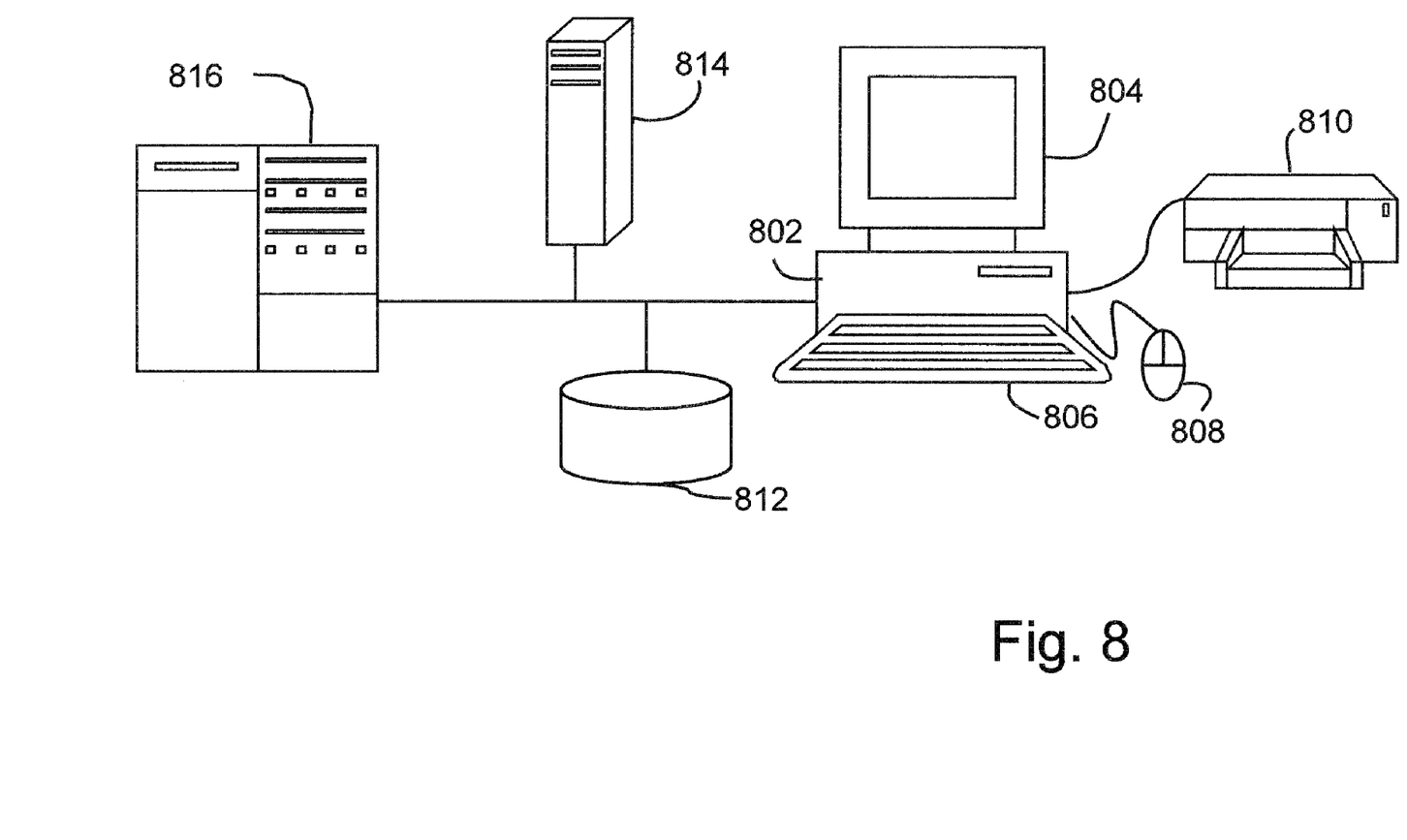
FIG. 8 illustrates an example of a computer system, in which the systems and methodologies of the present disclosure may be carried out or executed.

Referring now to FIG. 8, the systems and methodologies of the present disclosure may be carried out or executed in a computer system that includes a processing unit 802, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 802 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 804 for presenting output displays and providing a display through which the user may input data and interact with the processing system, for instance, in cooperation with input devices such as the keyboard 806 and mouse device 808 or pointing device. The computer processing system may be also connected or coupled to one or more peripheral devices such as the printer 810, scanner (not shown), speaker, and any other devices, directly or via remote connections. The computer processing system may be connected or coupled to one or more other processing systems such as a server 810, other remote computer processing system 814, network storage devices 812, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 802, 814, 816), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of visualizing Boolean expressions, comprising:
    identifying one or more Boolean operators in a Boolean expression;
    representing Boolean operators in the Boolean expression as graphical symbols;
    representing one or more NOT operators in the Boolean expression as one or more switches respectively; and
    building, by a processor, a visual flow of path representing the Boolean expression using the graphical symbols and said one or more switches, the building of the visual flow of path comprising, setting a state of traversal to positive and starting from a root of a tree representing a conditional portion of the Boolean expression that is parsed into a plurality of nodes in the tree:
        traversing a node in the tree;
        in response to determining the node represents a NOT operators,
            determining whether the state of traversal is positive or negative;
            in response to determining that said state is negative, outputting a negative flow graphical symbol on a display device, and in response to determining that said state is positive, outputting a positive flow graphical symbol on the display device, and returning to the traversing of the tree with a next node to traverse as the node;
        in response to determining the node is an AND operator,
            determining whether the state of traversal is positive or negative;
            in response to determining that said state is negative, outputting a horizontal group of operands associated with said AND operator, resetting said state to positive, and in response to determining that said state is positive, outputting a vertical group of operands associated with said AND operator, and returning to the traversing of the tree with a next node to traverse as the node;
        in response to determining that node is an OR operator,
            determining whether the state of traversal is positive or negative;
            in response to determining that said state is positive, outputting a horizontal group of operands associated with said OR operator, and in response to determining that said state is negative, outputting a vertical group of operands associated with said OR operator, resetting said state to positive, and returning to the traversing of the tree with a next node to traverse as the node;
    displaying the visual flow of path using visual effects on a display device;
    receiving one or more values associated with one or more of respective said operands; and
    automatically indicating with said visual effects on the visual flow of path comprising the outputted nodes of the tree, whether said one or more values satisfy said conditional portion, wherein the Boolean expression is derived from a natural language of a business rule and the step of building a visual flow of path comprises grouping AND operators nested within a NOT operator horizontally.

2. The method of claim 1, further including validating the Boolean expression with live data.

3. The method of claim 1, further including:
    displaying the visual flow of path using visual effects.

4. The method of claim 1, wherein the step of building a visual flow of path includes:
    grouping OR operators nested within a NOT operators vertically.

5. The method of claim 1, wherein the step of building a visual flow of path includes:
    grouping AND operators vertically.

6. The method of claim 1, wherein the step of building a visual flow of path includes:
    grouping OR operators horizontally.

7. The method of claim 1, further including:
presenting data instances associated with the Boolean expression;
allowing a user to select one or more of the data instances and associate said selected one or more of the data instances with the visual flow of path;
receiving said one or more user selected data instances; and
indicating one or more nodes in the visual flow of path whose conditions are satisfied by said one or more user selected data instances.

8. A system of visualizing Boolean expressions, comprising:
a processor;
a module executable on the processor and operator to identify one or more Boolean operators in a Boolean expression, represent Boolean operators in the Boolean expression as graphical symbols, represent one or more NOT operators in the Boolean expression as one or more switches respectively, and build a visual flow of path representing the Boolean expression using the graphical symbols and said one or more switches, the module further operable to build the visual flow of path by at least setting a state of traversal to positive and starting from a root of a tree representing a conditional portion of the Boolean expression that is parsed into a plurality of nodes in the tree:
traversing a node in the tree;
in response to determining the node represents a NOT operators,
determining whether the state of traversal is positive or negative;
in response to determining that said state is negative, outputting a negative flow graphical symbol on a display device, and in response to determining that said state is positive, outputting a positive flow graphical symbol on the display device, and returning to the traversing of the tree with a next node to traverse as the node;
in response to determining the node is an AND operator,
determining whether the state of traversal is positive or negative;
in response to determining that said state is negative, outputting a horizontal group of operands associated with said AND operator, resetting said state to positive, and in response to determining that said state is positive, outputting a vertical group of operands associated with said AND operator, and returning to the traversing of the tree with a next node to traverse as the node;
in response to determining that node is an OR operator,
determining whether the state of traversal is positive or negative;
in response to determining that said state is positive, outputting a horizontal group of operands associated with said OR operator, and in response to determining that said state is negative, outputting a vertical group of operands associated with said OR operator, resetting said state to positive, and returning to the traversing of the tree with a next node to traverse as the node;
displaying the visual flow of path using visual effects on a display device;
receiving one or more values associated with one or more of respective said operands; and
automatically indicating with said visual effects on the visual flow of path comprising the outputted nodes of the tree, whether said one or more values satisfy said conditional portion, wherein the Boolean expression is derived from a natural language of a business rule and the step of building a visual flow of path comprises grouping AND operators nested within a NOT operator horizontally.

9. The system of claim 8, further including:
a user interface module operable to display the visual flow of path using visual effects.

10. The system of claim 9, wherein the user interface is further operable to present data instances associated with the Boolean expression, allow a user to select one or more of the data instances and associate said selected one or more of the data instances with the visual flow of path, receive said one or more user selected data instances, and indicate one or more nodes in the visual flow of path whose conditions are satisfied by said one or more user selected data instances.

11. The system of claim 10, wherein the module builds a visual flow of path by grouping AND operators nested within a NOT operator horizontally, grouping OR operators nested within a NOT operators vertically, grouping AND operators vertically, or grouping OR operators horizontally, or combinations thereof.

12. A program storage device readable by a machine, tangibly embodying a program of instructions executable by the machine to perform a method of visualizing Boolean expressions, comprising:
identifying one or more Boolean operators in a Boolean expression;
representing Boolean operators in the Boolean expression as graphical symbols;
representing one or more NOT operators in the Boolean expression as one or more switches respectively; and
building, by a processor, a visual flow of path representing the Boolean expression using the graphical symbols and said one or more switches, the building of the visual flow of path comprising, setting a state of traversal to positive and starting from a root of a tree representing a conditional portion of the Boolean expression that is parsed into a plurality of nodes in the tree:
traversing a node in the tree;
in response to determining the node represents a NOT operators,
determining whether the state of traversal is positive or negative;
in response to determining that said state is negative, outputting a negative flow graphical symbol on a display device, and in response to determining that said state is positive, outputting a positive flow graphical symbol on the display device, and returning to the traversing of the tree with a next node to traverse as the node;
in response to determining the node is an AND operator,
determining whether the state of traversal is positive or negative;
in response to determining that said state is negative, outputting a horizontal group of operands associated with said AND operator, resetting said state to positive, and in response to determining that said state is positive, outputting a vertical group of operands associated with said AND operator, and returning to the traversing of the tree with a next node to traverse as the node;
in response to determining that node is an OR operator,
determining whether the state of traversal is positive or negative;
in response to determining that said state is positive, outputting a horizontal group of operands associated with said OR operator, and in response to determining that said state is negative, outputting a vertical group of operands associated with said OR operator, resetting said state to positive, and returning to the traversing of the tree with a next node to traverse as the node;

displaying the visual flow of path using visual effects on a display device;

receiving one or more values associated with one or more of respective said operands; and automatically indicating with said visual effects on the visual flow of path comprising the outputted nodes of the tree, whether said one or more values satisfy said conditional portion, wherein the Boolean expression is derived from a natural language of a business rule and the step of building a visual flow of path comprises grouping AND operators nested within a NOT operator horizontally.

13. The program storage device of claim 12, further including validating the Boolean expression with live data.

14. The program storage device of claim 12, further including:

displaying the visual flow of path using visual effects.

15. The program storage device of claim 12, wherein the step of building a visual flow of path includes:

grouping AND operators nested within a NOT operator horizontally, grouping OR operators nested within a NOT operators vertically, grouping AND operators vertically, or grouping OR operators horizontally, or combinations thereof.

16. The program storage device of claim 12, further including:

presenting data instances associated with the Boolean expression;

allowing a user to select one or more of the data instances and associate said selected one or more of the data instances with the visual flow of path;

receiving said one or more user selected data instances; and indicating one or more nodes in the visual flow of path whose conditions are satisfied by said one or more user selected data instances.

17. The program storage device of claim 16, wherein the step of indicating includes highlighting said one or more nodes in the visual flow of path whose conditions are satisfied by said one or more user selected data instances.

* * * * *